(12) United States Patent
Xu et al.

(10) Patent No.: US 12,506,439 B2
(45) Date of Patent: Dec. 23, 2025

(54) CONNECTOR

(71) Applicant: Changshu Friends Connector Technology Co., Ltd.

(72) Inventors: Jianming Xu, Jiangsu (CN); Yifeng Wang, Jiangsu (CN); Rong Qian, Jiangsu (CN); Haiya Cao, Jiangsu (CN)

(73) Assignee: Changshu Friends Connector Technology Co., Ltd., Changshu (CN)

( * ) Notice: Subject to any disclaimer, the term of this patent is extended or adjusted under 35 U.S.C. 154(b) by 273 days.

(21) Appl. No.: 18/346,276

(22) Filed: Jul. 3, 2023

(65) Prior Publication Data
US 2024/0275331 A1    Aug. 15, 2024

(51) Int. Cl.
*H02S 40/34*     (2014.01)
*H02S 30/10*     (2014.01)
*H02S 40/36*     (2014.01)

(52) U.S. Cl.
CPC .............. *H02S 40/34* (2014.12); *H02S 30/10* (2014.12); *H02S 40/36* (2014.12)

(58) Field of Classification Search
CPC .......... H02S 40/34; H02S 30/10; H02S 40/36; Y02E 10/50
See application file for complete search history.

(56) References Cited

U.S. PATENT DOCUMENTS

| | | | | |
|---|---|---|---|---|
| 6,582,249 B1 * | 6/2003 | Boeck | ............. | H01R 12/62 439/492 |
| 7,387,537 B1 * | 6/2008 | Daily | ............. | H01R 13/6272 439/282 |
| 8,203,075 B2 * | 6/2012 | Wanqin | ............. | H02S 40/34 136/252 |
| 8,971,046 B2 * | 3/2015 | Solon | ............. | H05K 7/10 361/728 |
| 9,018,518 B2 * | 4/2015 | Philipp | ............. | H10F 19/90 136/256 |
| 10,720,540 B2 * | 7/2020 | Wang | ............. | H02S 40/36 |

* cited by examiner

*Primary Examiner* — Thienvu V Tran
*Assistant Examiner* — Muaamar Qahtan Al-Taweel

(57) ABSTRACT

A new connector includes a photovoltaic module, a negative busbar socket, a positive busbar socket, a bypass busbar socket, and a module socket. The negative busbar socket and positive busbar socket are inserted into the module socket. The negative busbar socket is connected to a first busbar cable. The new connector according to the present disclosure achieves a reliable connection, enhances an energy conversion efficiency of modules, implements ventilation and heat dissipation using an aluminum frame, and improves a current-carrying capacity of the connector. In addition, required lengths of cables can be determined according to actual needs of an installation site, and thus costs of the cables are saved.

7 Claims, 4 Drawing Sheets

CONNECTOR

CROSS-REFERENCE TO RELATED APPLICATIONS

This application claims priority of Chinese Patent Application No. 202310117556.8, filed on Feb. 15, 2023, the entire contents of which are incorporated herein by reference.

TECHNICAL FIELD

The present disclosure relates to the field of photovoltaic module connectors, and in particular, relates to a new type of connector.

BACKGROUND

Photovoltaic connectors are supporting devices for mating and connection of photovoltaic modules. As important parts of the photovoltaic modules, the photovoltaic connectors are in one aspect used with photovoltaic junction boxes and thus protect the photovoltaic modules from hot spots, and in another aspect are capable of connecting various photovoltaic modules for transmission. A photovoltaic connector is typically composed of cables, terminals, connection heads, and the like parts. The terminal of the photovoltaic connector is connected to a junction box on a monolithic photovoltaic module, and the connection head at the other end is collected to an output cable by series/parallel connection. As the advancement of technology, people are imposing stricter and stricter requirements on a manufacturing process of the connector.

A conventional photovoltaic connector is generally for use with the junction box and mounted on the photovoltaic module, and thus has some disadvantages.

In assembling a traditional structure, the position of the junction box is bonded and contacted with the position of a backplate of the photovoltaic module. The backplate is heated due to heat generated from operating of a battery panel of the photovoltaic module, such that performance of the diode inside the junction box is affected to some extent. In this way, a heat dissipation effect of the diode is poor, and the diode is prone to damage and short circuit. In production, a traditional photovoltaic module needs to be mounted with the junction box at the back, and mounting of the junction box on the photovoltaic module needs to go through the following steps: gluing at the back of the module—welding a busbar of the module to a conductive sheet of the junction box—pouring glue inside the junction box (silica gel also needs a specific curing time)—mounting a box cover, all of the steps are tedious, resulting in high site and time costs and low production efficiency. Moreover, the junction box is needed by module manufacturers in process of producing photovoltaic modules, and production costs of modules are also high; when the junction box is mounted on the module, the cables with a specific length, which are costly and inconvenient to mount, need to be configured for the junction box according to different customer requirements. In addition, due to junction boxes and cables are on the whole module, it is not conducive to packaging and transportation of the modules, and a dust-proof effect is also poor, which brings adverse effects to actual using.

Accordingly, a new type of connector is provided in the present disclosure.

SUMMARY

In view of the above technical problem, various embodiments of the present disclosure provide a connector. The connector achieves a reliable connection, enhances an energy conversion efficiency of modules, optimizes a structure of the modules, simplifies mounting operations, implements ventilation and heat dissipation using an aluminum frame, and improves a current-carrying capacity of the connector. In addition, required lengths of cables can be determined according to actual needs of an installation site, costs of the cables are saved, energy transmission loss is reduced, and thus the technical problems in the background are solved.

According to the embodiments of the present disclosure, the new connector includes a photovoltaic module, a negative busbar socket, a positive busbar socket, a bypass busbar socket, and a module socket. The negative busbar socket and the positive busbar socket are inserted into the module socket. The negative busbar socket is connected to a first busbar cable, wherein the first busbar cable is connected to a first diode assembly, and the first diode assembly is connected to a first plug terminal and is snapped at an edge of one side of the photovoltaic module. The positive busbar socket is connected to a second busbar cable, wherein the second busbar cable is connected to a second diode assembly, and the second diode assembly is connected to a second plug terminal and is snapped at an edge of the other side of the photovoltaic module. The bypass busbar socket is connected to a bypass connector.

In some embodiments, a plug is connected to the module socket, wherein a copper piece is electrically mounted on the plug; and a dust cover is snapped at an outer side of the module socket on the photovoltaic module; wherein an outer wall of the plug is positioned with an insulating sealing ring.

In some embodiments, the negative busbar socket and the positive busbar socket (6) are snapped, positioned and inserted at a front end of the module socket; and the negative busbar socket and the positive busbar socket are electrically connected to the module socket separately.

In some embodiments, the negative busbar socket is electrically connected to the first diode assembly and the first plug terminal via the first busbar cable; the positive busbar socket is electrically connected to the second diode assembly and the second plug terminal via the second busbar cable; and the second plug terminal on one set of the photovoltaic module is electrically connected to the first plug terminal on another set of the photovoltaic module.

In some embodiments, the first diode assembly and the second diode assembly (8) are positioned on two sides of the photovoltaic module via clamping seats.

In some embodiments, the dust cover is disassemblable at a back of the photovoltaic module; and the module socket, the plug, and the copper piece are electrically connected.

In some embodiments, the first diode assembly and the second diode assembly are mounted on a frame of a backplate via fasteners and are away from a plate body at a predetermined distance; and the first diode assembly and the second diode assembly are internally provided with diodes such that the diodes are not in contact with the backplate.

In some embodiments, the bypass connector is internally equipped with the diode; the negative busbar socket, the positive busbar socket, and the bypass busbar socket form a three-part junction box structure; and the negative busbar socket, the positive busbar socket, and the bypass busbar socket are positioned via a socket-type connection structure.

Additional aspects and advantages of the present disclosure will be provided partially in the description below, where some will be apparent from the description below, or be understood through the practice of the present disclosure.

Compared with the prior art, the present disclosure provides a new connector and has the following beneficial effects: the connector achieves a reliable connection, enhances an energy conversion efficiency of modules, optimizes a structure of the modules, simplifies mounting operations, implements ventilation and heat dissipation using an aluminum frame, and improves a current-carrying capacity of the connector. In addition, required lengths of cables can be determined according to actual needs of an installation site, costs of the cables are saved, energy transmission loss is reduced. A traditional junction box mounted at an module end is replaced with a base mounted on an outlet of an original busbar, so as to facilitate subsequent connection with a matched new connector, such that some problems in designing the module are avoided, and product performance and manufacturability are improved.

The structure of the module is optimized: a small-size socket is mounted at an outlet of a busbar, and the socket may be fixed with 3M tape, thereby simplifying the mounting operations.

Mounting of a junction box is avoided. Conventional welded connections are replaced by socket-type clamping connections, such that pseudo soldering is prevented and a reliable connection is achieved. A glue-pouring process is avoided and glue-curing steps are meanwhile not needed, such that occupation of the production site is reduced and the energy conversion efficiency of the module is improved.

The modules have unified specifications, and thus the production coordination efficiency and universality are both improved. Specifically, the diode is designed at the connector end, and the connector may be directly fixed on the frame of the module, such that the diode is far away from the backplate of the module and the heat produced by the module is prevented form affecting the performance of the diode. In addition, the heat produced by the diode can be dissipated by the aluminum frame, such that the current-carrying capacity of the connector is improved.

The newly designed base of the module is provided with a dust cover. Specifically, when the module needs to be connected, the dust cover is taken down, and the connection end of the module is inserted into the base, and the traditional connector end is inserted into positive and negative poles of the traditional connector of another module, such that a failure caused by direct exposure of the traditional module to outdoors upon mounting but prior to connection of the connector is avoided.

On-site mounting is convenient. Specifically, according to actual needs of the mounting site, the required lengths of the cables are determined, costs of the cables are saved, and energy transmission loss is reduced.

Where the diode is damaged or other irreparable problems occur to the diode, the damaged connector may be directly removed and replaced on site, which is convenient and time-saving. In this way, the maintenance cost is reduced. Therefore, the whole connector is simple in structure and easy in operation, and an effect in use is better than a traditional way.

REFERENCE NUMERALS AND DENOTATIONS THEREOF

1—Photovoltaic module
2—First plug terminal
3—First diode assembly
4—First busbar cable
5—Negative busbar socket
6—Positive busbar socket
7—Second busbar cable
8—Second diode assembly
9—Second plug terminal
10—Module socket
11—Plug
12—Copper piece
13—Dust cover
14—Bypass connector
15—Bypass busbar socket
16—Insulating sealing ring

DETAILED DESCRIPTION

For clearer descriptions of the objectives, technical solutions and advantages of the embodiments of the present disclosure clearer, the technical solutions according to the embodiments of the present disclosure are clearly and thoroughly described with reference to the accompanying drawings of the embodiments of the present disclosure. The described embodiments are merely exemplary ones, but are not all the embodiments of the present disclosure and shall not be considered as limiting the protection scope.

In the description of the present disclosure, it should be understood that the terms "center," "upper," "lower," "left," "right," "vertical," "horizontal," "inner," "outer," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure. In addition, the terms "first," "second," and "third" are merely for the illustration purpose, and shall not be construed as indicating or implying a relative importance.

In the description of the embodiments of the present disclosure, it should be noted that unless otherwise specified and defined, the terms "mounted," "coupled," "connected," and derivative forms thereof shall be understood in a broad sense, which, for example, may be understood as fixed connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the present invention according to the actual circumstances and contexts.

Figure 1:
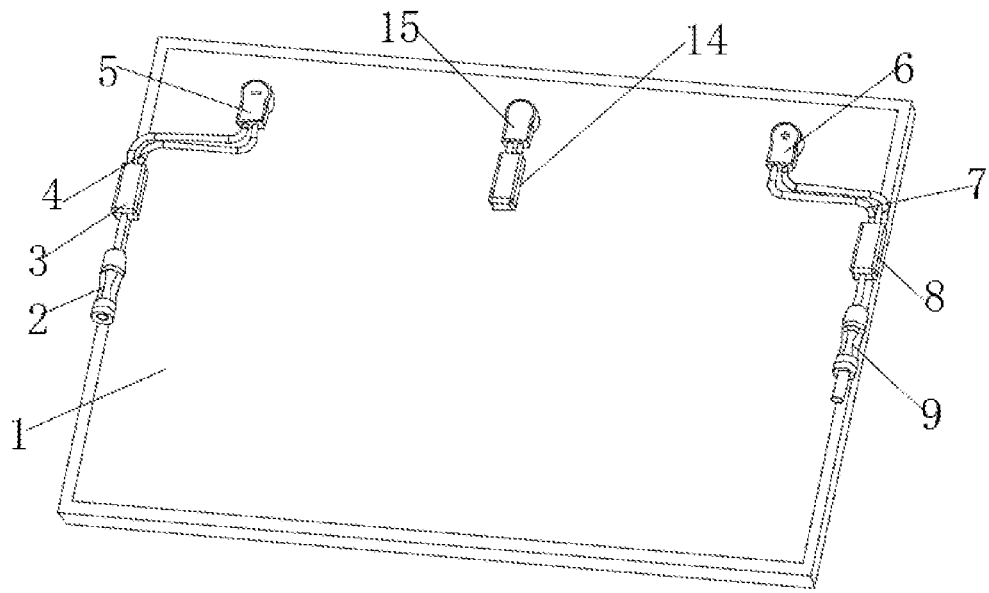
FIG. 1 is an overall structure diagram of a new connector according to some embodiments of the present disclosure.
Figure 2:
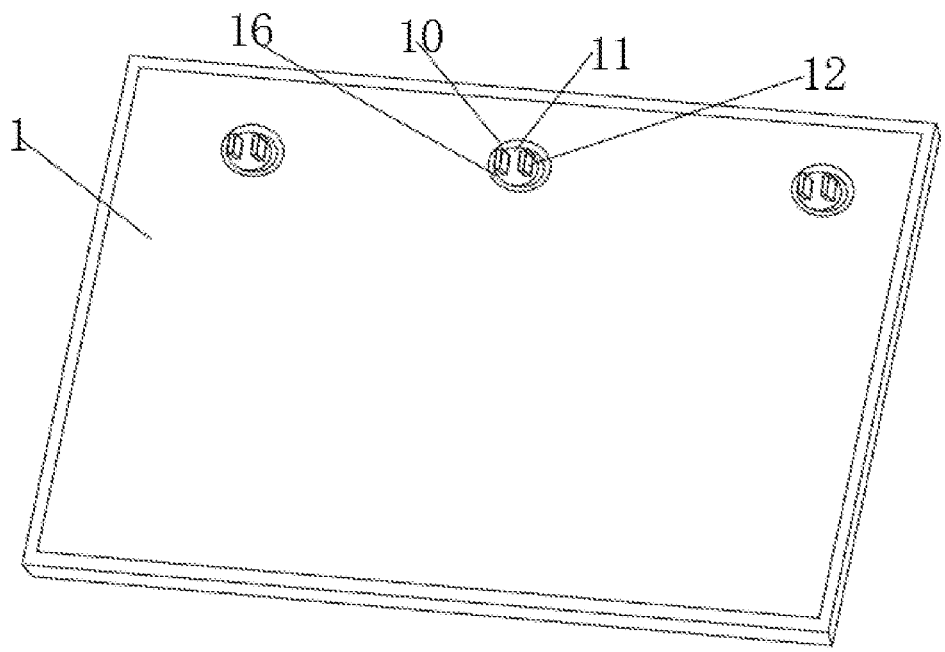
FIG. 2 is a rear view of a photovoltaic module of a new connector according to some embodiments of the present disclosure.
Figure 3:
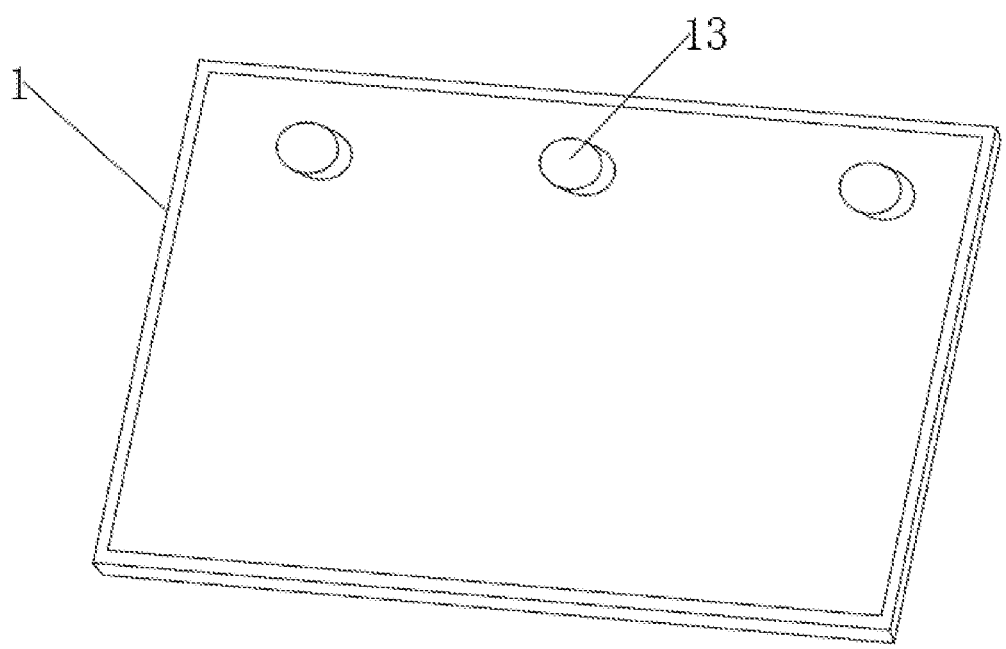
FIG. 3 is a structural diagram of installing a dust cover of a new connector according to some embodiments of the present disclosure.
Figure 4:
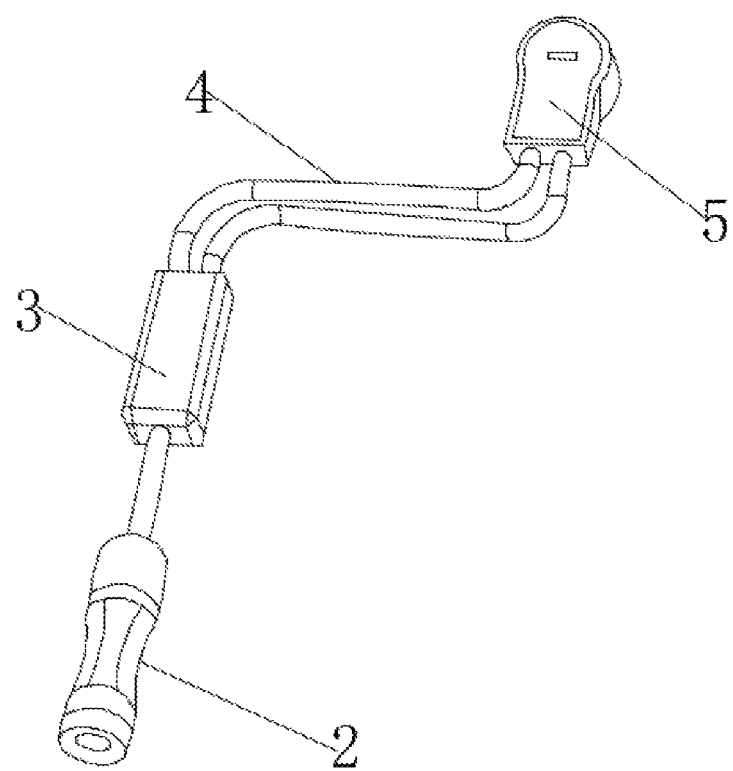
FIG. 4 is a structural diagram of connecting a first diode assembly of a new connector according to some embodiments of the present disclosure.
Figure 5:
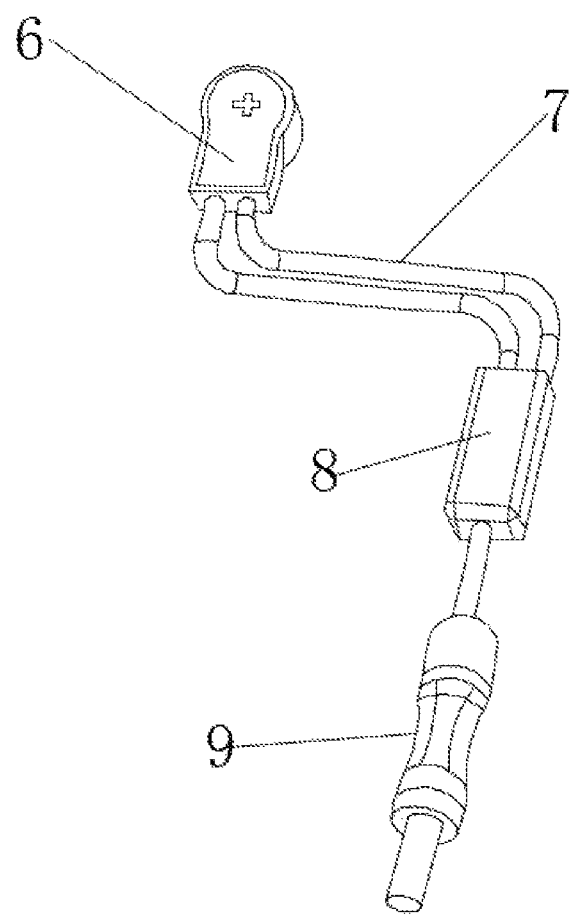
FIG. 5 is a structural diagram of connecting a second diode assembly of a new connector according to some embodiments of the present disclosure.

As shown in FIGS. 1 to 5, a new connector includes a photovoltaic module 1, a negative busbar socket 5, a positive busbar socket 6, a bypass busbar socket 15, and a module socket 10. The negative busbar socket 5 and the positive busbar socket 6 are inserted into the module socket 10. The negative busbar socket 5 is connected to a first busbar cable 4, wherein the first busbar cable 4 is connected to a first diode assembly 3, and the first diode assembly 3 is connected to a first plug terminal 2 and is snapped at an edge of one side of the photovoltaic module 1. The positive busbar socket 6 is connected to a second busbar cable 7, wherein the second busbar cable 7 is connected to a second diode assembly 8, and the second diode assembly 8 is connected to a second plug terminal 9 and is snapped at an edge of the other side of the photovoltaic module 1. The bypass busbar socket 15 is connected to a bypass connector 14. The new connector achieves a reliable connection, enhances an energy conversion efficiency of modules, optimizes a structure of the modules, simplifies mounting operations, implements ventilation and heat dissipation using an aluminum frame, and improves a current-carrying capacity of the connector. In addition, required lengths of cables can be determined according to actual needs of an installation site, costs of the cables are saved, and energy transmission loss is reduced.

In some embodiments, a plug 11 is connected to the module socket 10, wherein a copper piece 12 is electrically mounted on the plug 11; and a dust cover 13 is snapped at an outer side of the module socket 10 on the photovoltaic module 1; wherein an outer wall of the plug 11 is positioned with an insulating sealing ring 16.

In some embodiments, the negative busbar socket 5 and the positive busbar socket 6 are snapped, positioned and inserted at a front end of the module socket 10; and the negative busbar socket 5 and the positive busbar socket 6 are electrically connected to the module socket 10 separately.

In some embodiments, the negative busbar socket 5 is electrically connected to the first diode assembly 3 and the first plug terminal 2 via the first busbar cable 4; the positive busbar socket 6 is electrically connected to the second diode assembly 8 and the second plug terminal 9 via the second busbar cable 7; and the second plug terminal 9 on one set of the photovoltaic module 1 is electrically connected to the first plug terminal 2 on another set of the photovoltaic module 1.

In some embodiments, the first diode assembly 3 and the second diode assembly 8 are positioned on two sides of the photovoltaic module 1 via clamping seats.

In some embodiments, the dust cover 13 is disassemblable at a back of the photovoltaic module 1; and the module socket 10, the plug 11, and the copper piece 12 are electrically connected.

In some embodiments, the first diode assembly 3 and the second diode assembly 8 are mounted on a frame of a backplate via fasteners and are away from a plate body at a predetermined distance; and the first diode assembly 3 and the second diode assembly 8 are internally provided with diodes such that the diodes are not in contact with the backplate.

In some embodiments, the bypass connector 14 is internally equipped with the diode; the negative busbar socket 5, the positive busbar socket 6, and the bypass busbar socket 15 form a three-part junction box structure; and the negative busbar socket 5, the positive busbar socket 6, and the bypass busbar socket 15 are positioned via a socket-type connection structure.

In summary, the new connector according to the present disclosure includes the photovoltaic module 1, the first plug terminal 2, the first diode assembly 3, the first busbar cable 4, the negative busbar socket 5, the positive busbar socket 6, the second busbar cable 7, the second diode assembly 8, the second plug terminal 9, the module socket 10, the plug 11, the copper piece 12, the dust cover 13, the bypass connector 14, the bypass busbar socket 15, and the insulating sealing ring 16. The first diode assembly 3 and the second diode assembly 8 are mounted on the frame of the backplate via the fasteners and are away from the plate body at the predetermined distance. The first diode assembly 3 and the second diode assembly 8 are internally provided with diodes such that the diodes are not in contact with the backplate. The diode is designed at the connector, and the connector may be directly fixed on the frame of the module, such that the diode is far away from the backplate of the module and the heat produced by the module is prevented form affecting the performance of the diode. In addition, the heat produced by the diode can be dissipated by the aluminum frame, such that the current-carrying capacity of the connector is improved, reliable connection is achieved, the energy conversion efficiency of the module is enhanced, the structure of the modules is optimized, and the mounting operations are simplified. Moreover, required lengths of cables can be determined according to actual needs of an installation site, costs of the cables are saved, and energy transmission loss is reduced. In assembling of the module, a busbar connection end of the connector is buckled into a busbar base of the module firstly, and then a conventional connector end is inserted, so as to complete mounting. The cable of the conventional connector end may be customized according to actual needs, thereby ensuring no redundant cables.

Mounting of a junction box is avoided. Conventional welded connections are replaced by socket-type clamping connections, such that pseudo soldering is prevented and a reliable connection is achieved. A glue-pouring process is avoided and glue-curing steps are meanwhile not needed, such that occupation of the production site is reduced and the energy conversion efficiency of the module is improved. The structure of the module is optimized. A small-size socket is mounted at an outlet of a busbar, and the socket may be fixed with 3M tape, thereby simplifying the mounting operations.

The new connector according to the present disclosure is employed for connecting the modules. Specifically, the diode is designed at the connector end, and the connector may be directly fixed on the frame of the module, such that the diode is far away from the backplate of the module and the heat produced by the module is prevented form affecting the performance of the diode. In addition, the heat produced by the diode can be dissipated by the aluminum frame, such that the current-carrying capacity of the connector is improved.

On-site mounting is convenient. Specifically, according to actual needs of the mounting site, the required lengths of the cables are determined, costs of the cables are saved, and energy transmission loss is reduced.

The newly designed base of the module is provided with a dust cover. Specifically, when the module needs to be connected, the dust cover is taken down, and the connection end of the module is inserted into the base, and the traditional connector end is inserted into positive and negative poles of the traditional connector of another module, such that a failure caused by direct exposure of the traditional module to outdoors upon mounting but prior to connection of the connector is avoided.

The modules have unified specifications, and thus the production coordination efficiency and universality are both improved.

Where the diode is damaged or other irreparable problems occur to the diode, the damaged connector may be directly removed and replaced on site, which is convenient and time-saving. In this way, the maintenance cost is reduced.

It should be noted that, in the text, the relation terms such as first and second (number one and number two) are merely used for distinguishing one entity or operation from another entity or operation, rather than necessarily demanding or implying the existence of any such actual relationship or order between these entities or operations. Moreover, terms "comprise," "include," or any other variations thereof are intended to cover non-exclusive inclusions, such that a process, a method, an object or a device that include a series of elements may include not only those elements, but also other elements not clearly listed, or also include elements inherent to the process, method, object or device. In the absence of more limitations, the element defined by a phrase "including a . . . " is not excluded the existence of other identical elements in the process, method, object or device including the element.

The above shows and describes the basic principles, main characteristics and advantages of the present disclosure. Those skilled in the art should understand that the present disclosure is not limited by the above examples. The examples and specification described above are only the principle of the present disclosure, and various modifications and improvements without departing from the spirit and scope of the present disclosure can be made. All the modifications and improvements fall within the scope of protection of the present disclosure.

The invention claimed is:

1. A new connector, comprising:
    a photovoltaic module (1);
    a negative busbar socket (5);
    a positive busbar socket (6);
    a bypass busbar socket (15); and
    a module socket (10);
    wherein
    the negative busbar socket (5) and the positive busbar socket (6) are inserted into the module socket (10);
    the negative busbar socket (5) is connected to a first busbar cable (4), wherein the first busbar cable (4) is connected to a first diode assembly (3), and the first diode assembly (3) is connected to a first plug terminal (2) and is snapped at an edge of one side of the photovoltaic module (1);
    the positive busbar socket (6) is connected to a second busbar cable (7), wherein the second busbar cable (7) is connected to a second diode assembly (8), and the second diode assembly (8) is connected to a second plug terminal (9) and is snapped at an edge of the other side of the photovoltaic module (1); and the bypass busbar socket (15) is connected to a bypass connector (14);
    wherein
    the negative busbar socket (5) is electrically connected to the first diode assembly (3) and the first plug terminal (2) via the first busbar cable (4);
    the positive busbar socket (6) is electrically connected to the second diode assembly (8) and the second plug terminal (9) via the second busbar cable (7); and
    the second plug terminal (9) on one set of the photovoltaic module (1) is electrically connected to the first plug terminal (2) on another set of the photovoltaic module (1);
    wherein the first diode assembly (3) and the second diode assembly (8) are internally provided with diodes such that a diode of the first diode assembly (3) and a diode of the second diode assembly (8) are not in contact with a backplate.

2. The new connector according to claim 1, wherein
    a plug (11) is connected to the module socket (10), wherein a copper piece (12) is electrically mounted on the plug (11); and
    a dust cover (13) is snapped at an outer side of the module socket (10) on the photovoltaic module (1);
    wherein an outer wall of the plug (11) is positioned with an insulating sealing ring (16).

3. The new connector according to claim 1, wherein
    the negative busbar socket (5) and the positive busbar socket (6) are snapped, positioned and inserted at a front end of the module socket (10); and
    the negative busbar socket (5) and the positive busbar socket (6) are electrically connected to the module socket (10) separately.

4. The new connector according to claim 1, wherein the first diode assembly (3) and the second diode assembly (8) are positioned on two sides of the photovoltaic module (1) via clamping seats.

5. The new connector according to claim 2, wherein
    the dust cover (13) is disassemblable at a back of the photovoltaic module (1); and
    the module socket (10), the plug (11), and the copper piece (12) are electrically connected.

6. The new connector according to claim 1, wherein
    the first diode assembly (3) and the second diode assembly (8) are mounted on a frame of a backplate via fasteners and are away from a plate body at a predetermined distance.

7. The new connector according to claim 1, wherein
    the bypass connector (14) is internally equipped with the diode;
    the negative busbar socket (5), the positive busbar socket (6), and the bypass busbar socket (15) form a three-part junction box structure; and
    the negative busbar socket (5), the positive busbar socket (6), and the bypass busbar socket (15) are positioned via a socket-type connection structure.

* * * * *